(12) United States Patent
Gonzalez

(10) Patent No.: US 8,162,497 B2
(45) Date of Patent: Apr. 24, 2012

(54) CONTROL OF EMITTED LIGHT FROM LUMINAIRE

(76) Inventor: David Gonzalez, Burbank, CA (US)

( * ) Notice: Subject to any disclaimer, the term of this patent is extended or adjusted under 35 U.S.C. 154(b) by 553 days.

(21) Appl. No.: 12/328,975

(22) Filed: Dec. 5, 2008

(65) Prior Publication Data

US 2009/0161339 A1    Jun. 25, 2009

Related U.S. Application Data

(60) Provisional application No. 61/014,884, filed on Dec. 19, 2007, provisional application No. 61/074,215, filed on Jun. 20, 2008.

(51) Int. Cl.
*G03B 15/02* (2006.01)
(52) U.S. Cl. .............. 362/16; 362/17; 362/355
(58) Field of Classification Search .......... 362/3, 8, 362/11, 16, 17, 18, 246, 268, 355, 356, 357
See application file for complete search history.

(56) References Cited

U.S. PATENT DOCUMENTS

| | | | | |
|---|---|---|---|---|
| 3,397,023 A | * | 8/1968 | Land | 362/16 |
| 5,128,838 A | * | 7/1992 | Brandess | 362/18 |
| 5,477,422 A | * | 12/1995 | Hooker et al. | 362/29 |
| 7,810,941 B2 | * | 10/2010 | Capozzi | 362/17 |

* cited by examiner

*Primary Examiner* — Y My Quach Lee
(74) *Attorney, Agent, or Firm* — James A. Italia; Italia IP

(57) ABSTRACT

Method and apparatus for attenuating unwanted aspects of lighting from a luminaire which is disposed to illuminate an object or objects being photographed. A light attenuating mask is disposed between the luminaire and the object or objects. The light attenuating mask may diffuse, obstruct, or otherwise modify projected light such that light intensity is diminished, unwanted reflections of the luminaire are suppressed, or other aspects of the light are altered. The mask may attach to the luminaire or may be free standing and separate therefrom.

8 Claims, 7 Drawing Sheets

CONTROL OF EMITTED LIGHT FROM LUMINAIRE

CROSS-REFERENCE TO RELATED APPLICATIONS

This application claims the benefit of the filing dates under 35 USC 119(e) to U.S. Provisional Application Ser. No. 61/014,884, filed Dec. 19, 2007, and U.S. Provisional Application Ser. No. 61/074,215, filed Jun. 20, 2008 the contents of which are incorporated herein by reference.

FIELD OF THE INVENTION

The present invention relates to control of light which is being intentionally projected from a luminaire onto an object or surface for the purpose of illuminating the object or surface. More specifically, the invention relates to controlling light originating from the luminaire so that harshness of the light, and unintended lighting effects which result from the luminaire are mitigated.

BACKGROUND OF THE INVENTION

The field of photography frequently uses supplemental intentional illumination of the subject of the photography. As employed herein, photography will be taken in its broadest context, encompassing still photography, dynamic photography (i.e., motion pictures), videography, and all forms of visual image capture. In professional settings, luminaires have been utilized to illuminate a subject to be photographed. This is done to improve the captured images. For example, a minimum level of light may be necessary to capture an image displaying optimum clarity and visibility. Also, certain optical effects may thus be realized, such as spotlighting certain parts of an object being imaged.

The use of supplementary luminaires may provide the requisite level of light, but may also be subject to certain unwanted effects. One possible unwanted effect is that of too much light impinging upon the subject, especially upon one portion of an object being photographed. As an illustration, a photographer may wish to photograph a large object such as an automobile, only to find that a supplemental luminaire creates overly bright lighting which disrupts the final image. The overly bright lighting may be limited to certain portions of the object being photographed, such that portions appear too bright relative to the rest of the object. Another potential problem may occur when shiny or reflective objects are being photographed. Illustratively, an automobile having a reflective surface may possibly transmit reflections of the luminaire to the camera, thereby disrupting the desired effect of the final image in that the luminaire may be fully or partially visible in the final image.

An example is seen in FIG. 8, wherein a bottle 2, which represents subject matter of photography, is being illuminated by a luminaire 4. The luminaire 4 has a stand 6 and a lighting head 8. The lighting head 8 includes three elongated fluorescent tubes 10, 12, 14. The bottle 2 is seen to bear a reflection 16 in which are visibly reproduced the three fluorescent tubes 10, 12, 14. The lighting effect achieved by use of the luminaire 4 is somewhat harsh, as represented by the extreme contrast between the reflection 16 and the balance of the bottle 2, which is seen as quite dark. Both the contrast in brightness and the reproduction of the fluorescent tubes 10, 12, 14 are objectionable.

There exists a need in the prior art which enables luminaires to be used for illuminating an object being photographed, while limiting optical effects projected onto that object.

SUMMARY OF THE INVENTION

The present invention addresses the above need by providing apparatus and method of mitigating unwanted optical effects arising from the use of supplementary luminaires used to illuminate objects being photographed. In broad terms, the novel approach is to interpose a mask between the luminaire and the subject of photography. This mask passes light yet controls optical effects such that undesirable brightness and harshness are mitigated, and unwanted reflections originating from the luminaire are effectively if not totally suppressed.

The mask is generally transparent or translucent, and has light obstructing structure arranged so as to suppress light transmission progressively and increasingly with increasing distance from the center of the projected light beam. In the most preferred form of the invention, although not necessarily, progressive suppression of light is achieved so gradually that no discrete steps or zones of lighting, lighting levels, and optical effects will appear to the eye in the resulting photographic images.

It is an object of the invention, therefore, to suppress unwanted optical effects from use of supplementary illumination of a scene from which images are to be captured.

Another object of the invention is to avoid conspicuous or discernible transition as lighting is progressively controlled.

A further object of the invention is to provide apparatus which is useable with conventional photography lighting luminaires to achieve suppression of unwanted optical effects.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
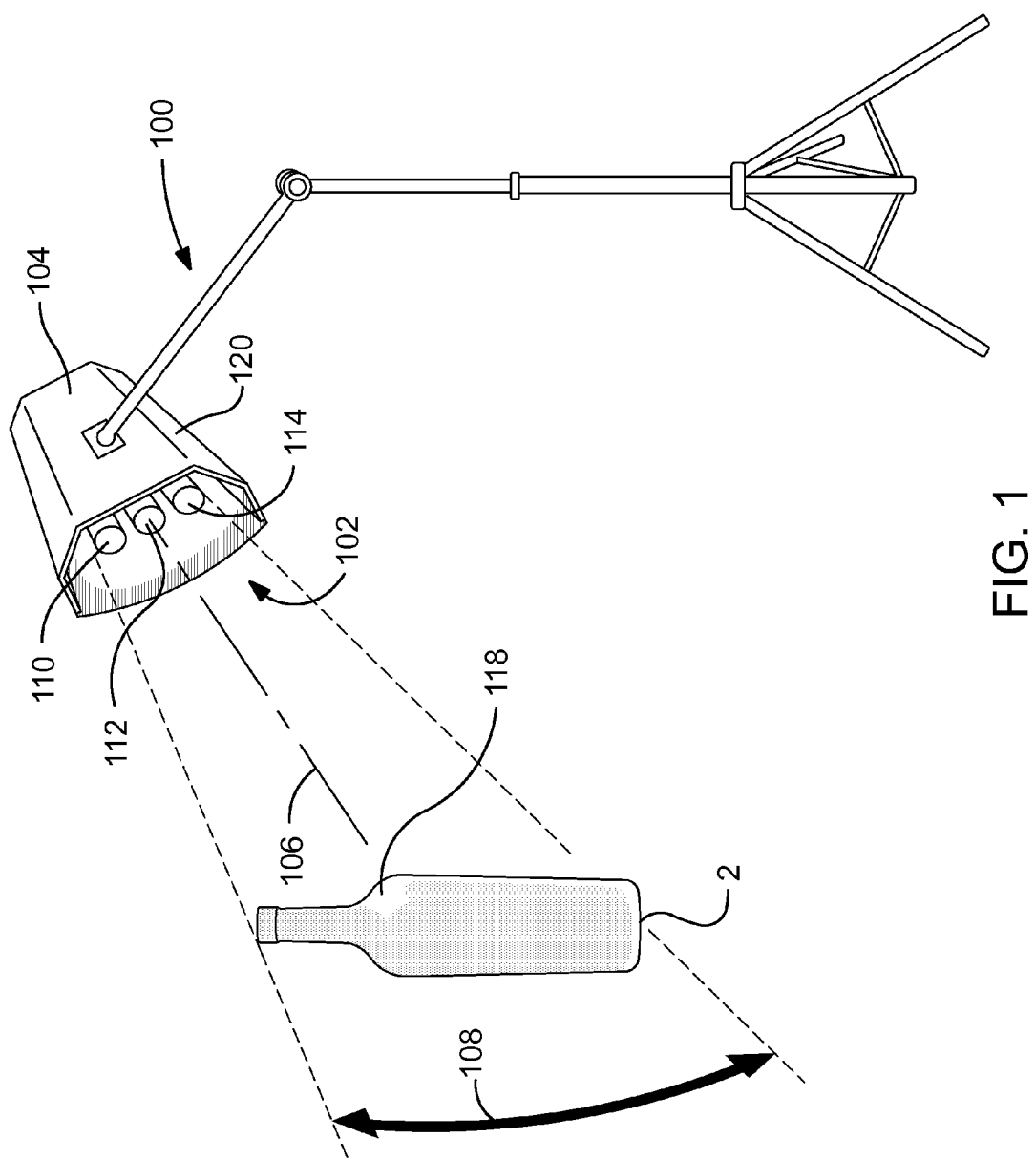
FIG. 1 is a perspective view of a bottle illuminated by a luminaire the optical effects of which are attenuated according to at least one aspect of the invention.

FIG. 1 of the drawings shows a combination of a luminaire 100 for illuminating subject matter 10 of photography, and a mask 102 disposed to mitigate undesired optical effects visited upon the subject matter, which undesired optical effects arise from the luminaire 100. The undesirable effects may include the reflection shown in FIG. 8 and discussed prior.

The luminaire 100 may comprise a lighting head 104 bearing at least one light source disposed to project light therefrom along a projection area having a central axis 106 and an adjacent zone surrounding the central axis 106. The adjacent zone is represented by an arrow 108, but will be understood to extend in two orthogonal dimensions rather than merely in one direction as visually suggested by the arrow 108. Illustratively, the light source may comprise three fluorescent tubes 110, 112, 114 arrayed parallel to one another as is frequently done with conventional luminaires such as the luminaire 4 of FIG. 1. Such an array would be generally rectangular, with the field of light or projection area being commensurately rectangular, although integrity of the rectangular configuration of the resultant light beam may diminish with distance from the light source or light sources. The central axis 106 represents the centerline of the rectangular of the projection area of the luminaire 100.

The mask 102 may alter characteristics of light projected from the luminaire 100 in one or both of two ways. First, the mask 102 may suppress optical intensity of the light projected from the luminaire 100 onto the bottle, which may be for example the bottle 2 of FIG. 8. Intensity may be suppressed in any suitable way, such as for example obstructing some of the light, by filtering one or more frequencies, or by diffusing the light. Obstruction may be achieved by translucence of the constituent material of a stratum (not separately shown) of the mask 102, by imposing a pattern of opaque or translucent material onto the mask 102 such that some light is obstructed and some not obstructed, or by a combination of techniques described herein. For purposes of attenuating intensity of light, degree of translucence may be varied to suit.

Figure 2:
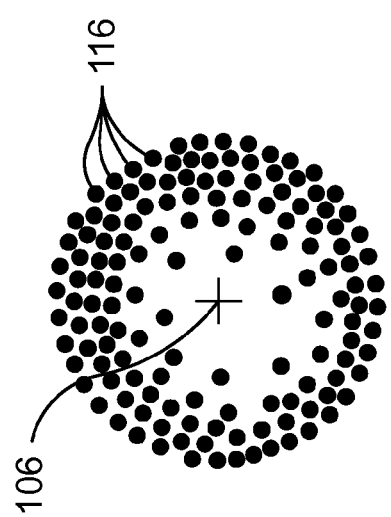
FIG. 2 is a plan view of an exemplary pattern of masking elements which progressively increasingly obstruct light with increasing distance from a central point of the pattern.

In a second way, intensity of light projected from the luminaire 100 may be selectively reduced with increasing distance from the axis 106. For example, where a pattern of lines, circles, or other recurring geometric elements are printed onto the constituent stratum of the mask 102, spacing separating one geometric element from the adjacent geometric element may decrease with increasing distance from the axis 106. An exemplary arrangement is shown in FIG. 2, where the axis 106 is surrounded by opaque circles or dots 116 which are increasingly closely spaced with increasing distance from the axis 106. Spacing may be progressively reduced to the point of generating a solid field (not shown) displaying total opacity if desired. Any one or any combination of elements which alter light characteristics will be referred to herein as light attenuating elements.

Figure 8:
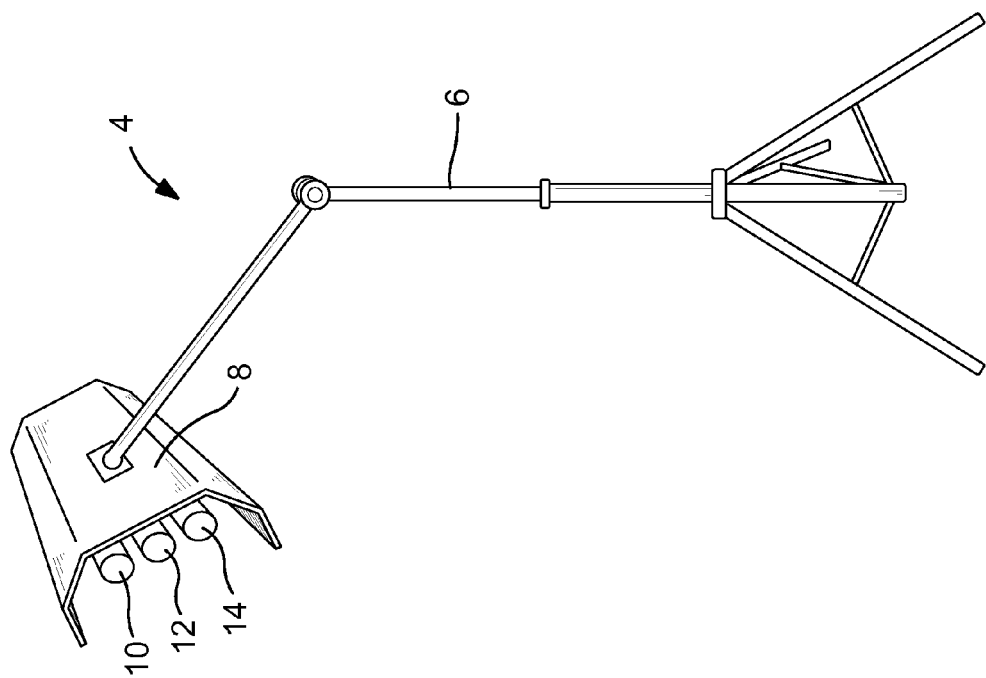
FIG. 8 is a perspective view of a bottle illuminated in conventional fashion by a luminaire.
Figure 8:
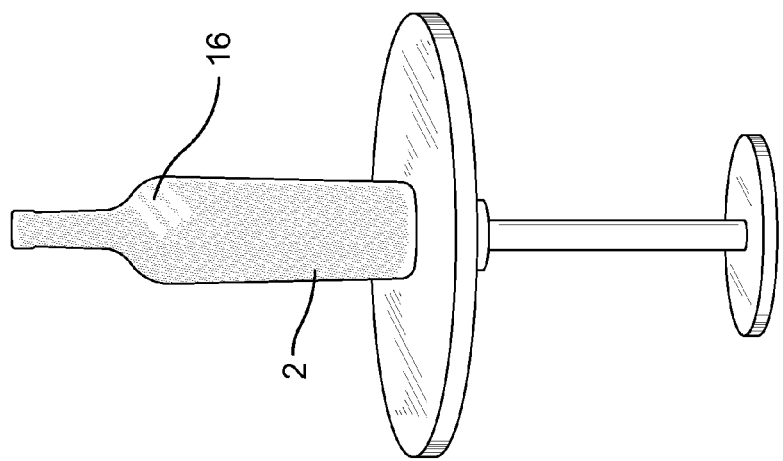

Again referring to FIG. 1, the optical effect of the mask 102 may include sufficient diffusion of light so as to eliminate the effect of FIG. 8, wherein each fluorescent tube 10, 12 or 14 produces a corresponding discrete visible element in the reflection 16. Rather, as seen in FIG. 1, a single bright spot 118 may be seen. The single bright spot 118 does not reproduce either any one of the individual fluorescent tubes 110, 112, 114, nor does it reproduce the housing 120 which partially envelops the fluorescent tubes 110, 112, 114. The image of the bottle 2 is also softened from that of FIG. 8 in that the extreme contrast between brightness of the reflection 16 and the rest of the bottle 2 as seen in FIG. 8 is reduced since more light strikes and is reflected that portion of the bottle 2 which lies outside the reflection 118 in FIG. 2. This is represented by cross hatching of that portion of the bottle 2 outside the reflection 118.

The luminaire 100 may comprise at least one light source, where "light source" signifies a lamp such as the fluorescent tubes 110, 112, 114. Of course, the light source may take any other form, such as incandescent lamps, light emitting diodes, electroluminescent elements, and others. The luminaire 100 may comprise a plurality of light sources in any combination of variety, size, light output, hue, and other optical characteristics, or may comprise a single light source.

Figure 3:
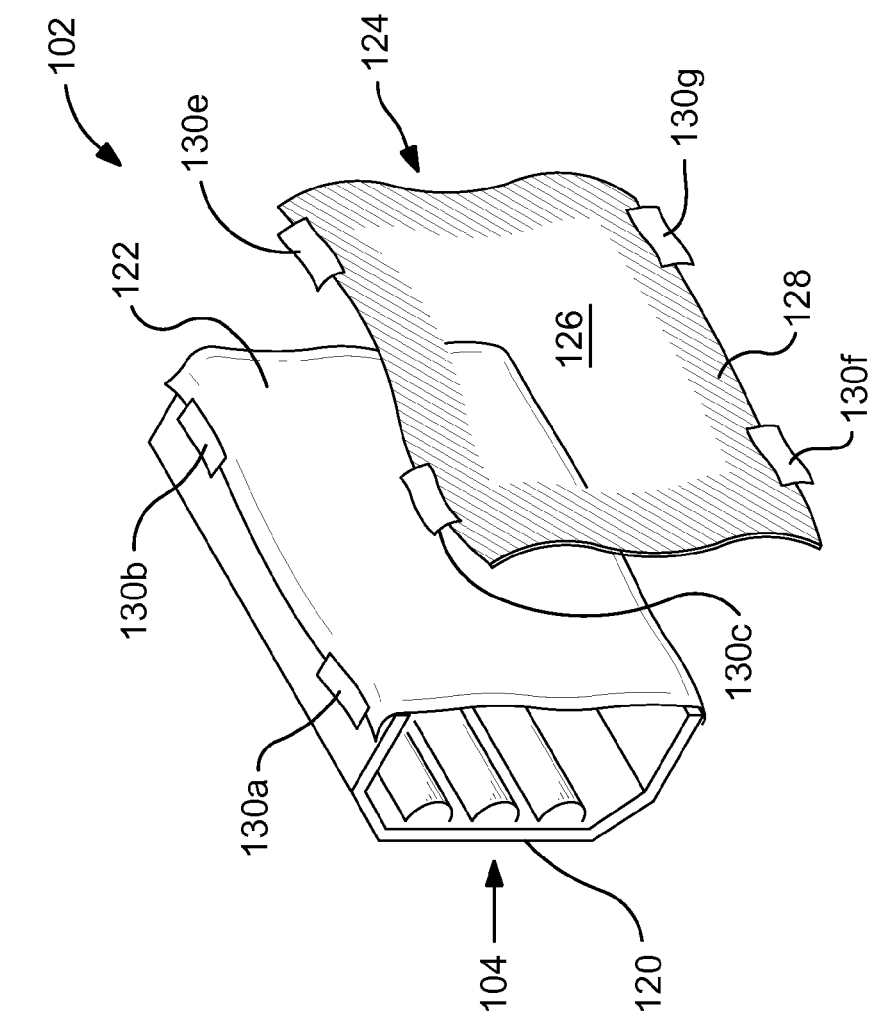
FIG. 3 is an exploded detail view of part of a luminaire provided with optical effects which are attenuated according to at least one aspect of the invention.

Turning momentarily to FIG. 3, the mask 102 may comprise two separate light transmissive strata 122, 124 which may overlie one another to achieve the two optical effects described above, namely, diffusion and progressive obstruction. In FIG. 3, the light transmissive stratum 122 may include a roughened surface or internally embedded light scattering particles or any other apparatus (none shown) which would randomly diffuse light from what would otherwise be a relatively coherent beam emanating from the light source or light sources. In FIG. 3, the light transmissive strata 122, 124 cover or encircle or partially encircle both the light sources (i.e., the fluorescent tubes 110, 112, 114) and also the housing 120. Of course, it is only critical to the invention to cover or substantially cover the light sources. Engagement of the housing 120 may be practiced as a convenience in attaching the strata 122, 124 to the lighting head 104, but is not necessary to attenuate lighting characteristics.

The light transmissive stratum 124 may have a pattern of translucent or opaque nature imprinted thereon so as to have a property of suppressing optical intensity of light projected from the luminaire 100 onto the subject matter such that relatively greatest light transmission occurs along the central axis 106 and relatively decreasing light transmission occurs with increasing distance from the central axis 106. Alternatively stated, the light transmissive stratum 124 may be regarded as a separate graduating stratum, whereas by contrast, the light transmissive stratum 122 serves as a diffusing stratum which uniformly diminishes light intensity throughout its full extent.

The light transmissive stratum 124 may have a relatively unobscured zone 126 and a relatively obscuring zone 128. Also, where even more effectively light suppressing zones are provided within the light transmissive stratum 124, the light attenuating elements will be selected to display relatively decreased light emission including plural levels of light projection, and wherein the light attenuating elements enable transition of light projected from one level of light projection to another level of light projection which is not readily discernible to the unaided eye. The latter condition comes into play where there are obscuring zones (not shown) which are comparable to and which would surround the obscuring zone 128, but which would display a still greater degree of light suppression than that of the obscuring zone 128.

FIG. 3 also shows another aspect of the invention, wherein the mask 102 is attached to and supported on the housing 120. To this end, the light transmissive strata 122 and 124 comprise flexible mounting tabs 130a, 130b, 130c, 130d, 130e, 130f, 130g which engage or encircle the housing 120, and which bear fastening elements (not separately shown) which may be disposed to engage the luminaire 100 and to secure the mask 102 in a selected mounting position on the luminaire 100. Each light transmissive stratum 122 or 124 has at least two mounting tabs such as the mounting tabs 130a, 130b, 130c, 130e. The fastening elements may comprise adhesive for direct engagement of the luminaire 100, and which adhesive will be understood to include hook and loop fastening arrangements for example. Of course, attachment may utilize encirclement and latching such as by hook and eye, snaps, buttons, resilient constriction, and any other known fastening method.

Figure 4:
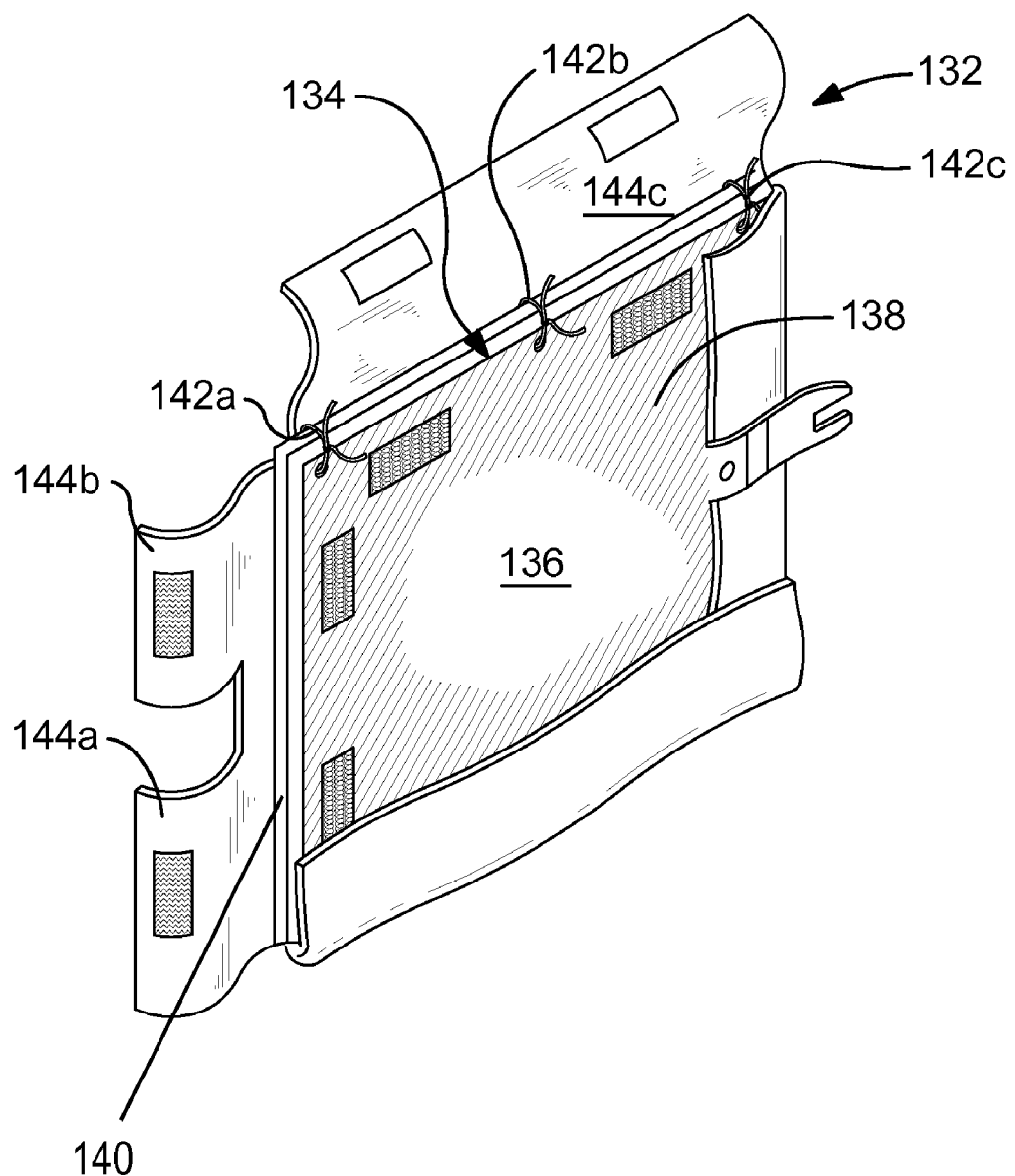
FIG. 4 is a perspective view of a mask for attenuating light from a luminaire, according to a further aspect of the invention.

FIG. 4 shows a graduating stratum 132 which may have a separate obscuring or light attenuating panel 134 including a relatively unobscured zone 136 and a surrounding obscuring zone 138. The graduating stratum 132 may be functionally similar to the light transmissive stratum 124 except that it may comprise a supporting frame 140 to which the panel 134 may be removably secured for example with cords 142a, 142b, 142c. The graduating stratum 132 may be removably connected to an associated luminaire, such as the luminaire 100, by flexible tabs 144a, 144b, 144c bearing hook and loop patches. Corresponding hook and loop patches (not shown) may be adhered to the associated luminaire.

Figure 5:
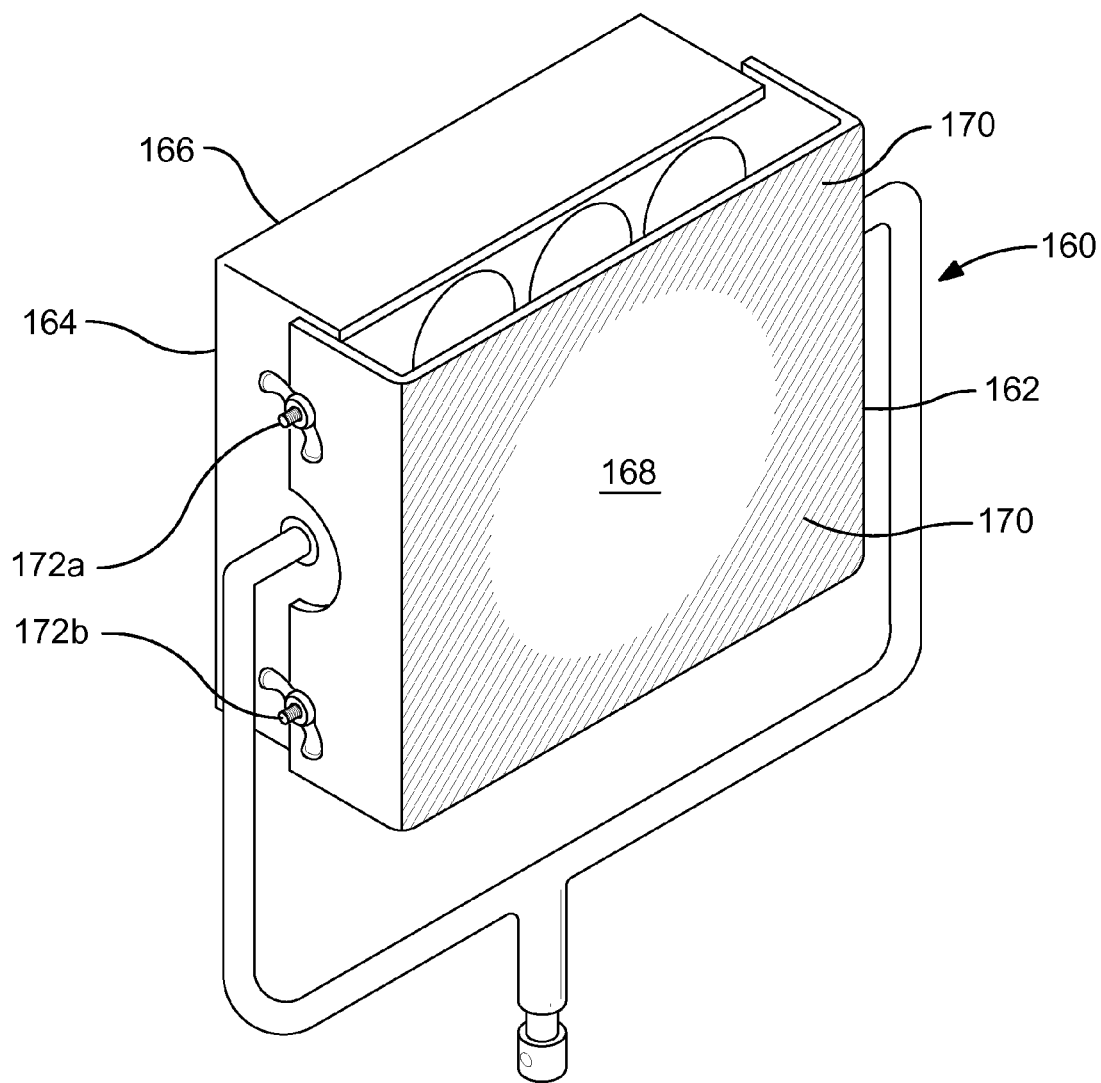
FIG. 5 is a perspective view of another mask for attenuating light from a luminaire on which the mask is mounted, according to still another aspect of the invention.

FIG. 5 shows a mask 160 comprising a light attenuating panel 162 mounted on a generally rigid housing or frame 164, which in turn may be mounted to a luminaire 166. The light attenuating panel 162 may have a relatively unobscured zone 168 and a surrounding obscuring zone 170, or may be of the diffusing type, such as the light transmissive stratum 122, or may have both characteristics. The mask 160 may be attached to the luminaire 166 by wing nuts 172a, 172b.

Figure 6:
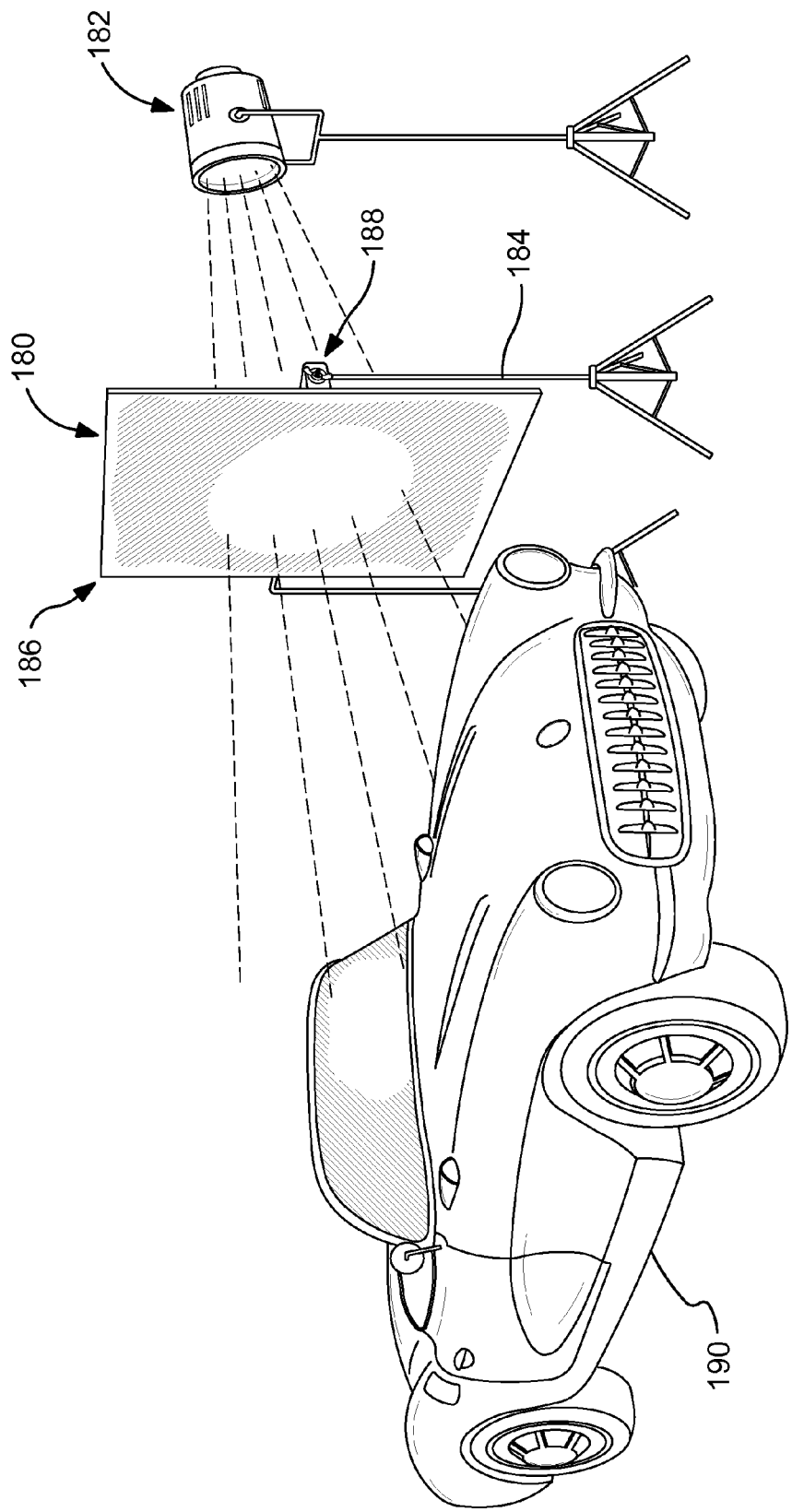
FIG. 6 is a perspective view of a luminaire, an automobile being illuminated for photographing, and a stand-alone mask for attenuating light from the luminaire, according to still a further aspect of the invention.

FIG. 6 shows an arrangement wherein a mask 180 is a stand-alone device. That is, it is maintained at a selected position relative to, spaced apart from, and unconnected to an associated luminaire 182. The luminaire 182 may be conventional in nature. This is accomplished by providing a stand comprising two legs such as the leg 184 to which a light attenuating panel 186 is affixed for example by a wing nut 188. The leg 184 represents any of many possible environmental surface engaging members (no others shown) which may be disposed to engage an environmental surface and to maintain the mask 180 at the selected position relative to the luminaire 182. This selected position will ordinarily imply that the mask 180 is positioned between the luminaire 180 and the subject of photography which is being illuminated by the luminaire 182. In this example, the subject of photography is an automobile 190. The light attenuating panel 186 may have any of the optical effects and mounting arrangements described herein.

Figure 7:
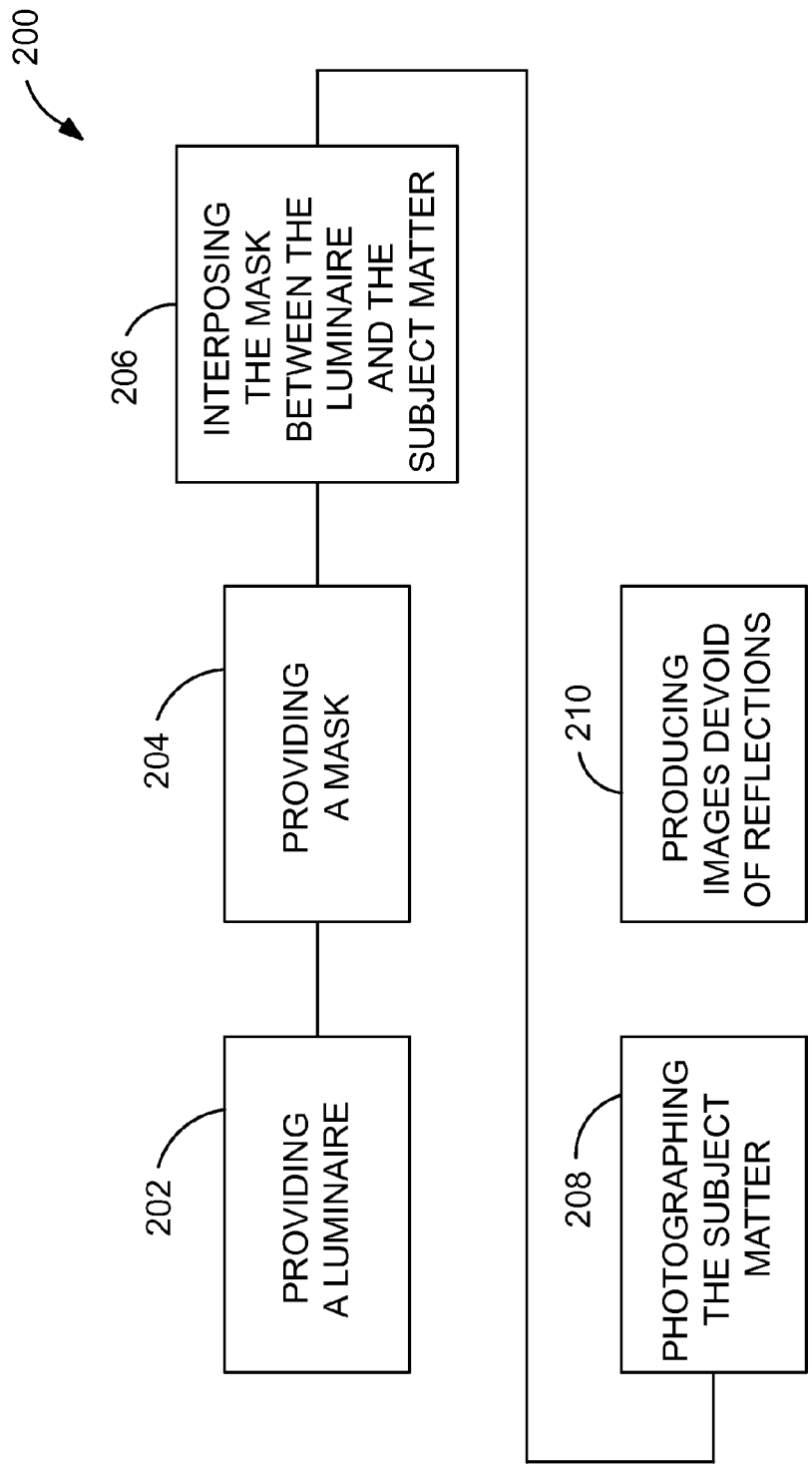
FIG. 7 is a block diagram of summarized steps of a method according to still another aspect of the invention, and is read starting at the upper left.

The invention may be regarded, in one aspect, as a method 200 of arranging lighting on subject matter of photography. Referring to FIG. 7, the method 200 may comprise a step 202 of providing a luminaire for illuminating the subject matter of photography, wherein the luminaire comprises at least one light source disposed to project light therefrom along a projection area having a central axis and an adjacent zone surrounding the central axis. The luminaire may be for example the luminaire 100 of FIG. 1.

The method 200 may comprise a step 204 of providing a mask disposed to mitigate undesired optical effects visited upon the subject matter, which undesired optical effects arise from the luminaire, wherein the mask comprises at least one light transmissive stratum which is operable to suppress optical intensity of light projected from the luminaire onto the subject matter such that relatively greatest light transmission occurs along the central axis and relatively decreasing light transmission occurs with increasing distance from the central axis. The mask may be for example the mask 102 of FIG. 1.

The method 200 may comprise a step 206 of interposing the mask between the luminaire and the subject matter of photography such that the mask attenuates light projected onto the subject of photography from the luminaire such that light is projected onto the subject matter at relatively greatest intensity along the central axis and at relatively decreasing intensity with increasing distance from the central axis such that transition from the greatest light transmission to the relatively decreasing light transmission is not readily discernible to the unaided eye. The subject matter of the step 206 may be as described hereinabove and as shown in FIGS. 1 through 6.

The method 200 may comprise a further step 208 of photographing the subject matter of photography; and a step 210 of producing images which are devoid of reflections of the luminaire. The photography process and images which are produced may be conventional.

The present invention is susceptible to modifications and variations which may be introduced thereto without departing from the inventive concepts. For example, it is important to note that elements of the inventive environment which are described in the singular will be understood to also encompass the plural. For example, while reference is made to a single object of photography, it will be appreciated that images may comprise plural objects, either similar in nature or different. Illustratively, imagery of one automobile among many, of one statue among other objects, or of one human subject beside other objects may enjoy the benefits of the invention. The novel optical effects described herein may apply to one degree or another to all objects to be photographed or otherwise subjected to image capture, as well as to solitary objects. Similarly, reference to a single luminaire may encompass usage of more than one luminaire. Reference to a single source of light such as a lamp within any one luminaire may encompass plural lamps used in one luminaire or used in plural luminaires. Reference to a single mask will be understood to encompass potential use of plural masks. Plural masks may be arranged serially, laterally adjacent, in full or partial overlapping manner, or in any combination of these arrangements. Reference to an image will be understood to encompass plural images, such as a series of images for generating a motion picture, or a series of redundant still images, or a series of complementing still or dynamic images.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. In combination, a luminaire for illuminating subject matter of photography, and a mask disposed to mitigate undesired optical effects visited upon the subject matter, which undesired optical effects arise from the luminaire, wherein the luminaire comprises at least one light source disposed to project light therefrom along a projection area having a central axis and an adjacent zone surrounding the central axis, and the mask comprises at least one light transmissive stratum which covers at least the light source of the luminaire, and light attenuating elements disposed on the light transmissive stratum, which light attenuating elements are operable to suppress optical intensity of light projected from the luminaire onto the subject matter such that relatively greatest light transmission occurs along the central axis and relatively decreasing light transmission occurs with increasing distance from the central axis wherein the light attenuating elements comprise a plurality of opaque dots which are increasingly closely spaced from one another with increasing distance from the central axis.

2. The combination of claim 1, wherein the light attenuating elements are printed onto the constituent stratum of the mask.

3. The combination of claim 1, wherein the light attenuating elements display relatively decreased light emission including plural levels of light projection, and wherein the light attenuating elements enable transition of light projected from one level of light projection to another level of light projection which is not readily discernible to the unaided eye.

4. The combination of claim 1, wherein
the luminaire comprises plural light sources and a housing disposed to encircle all of the plural light sources, and
the mask covers all of the plural light sources and also the housing.

5. The combination of claim 1, wherein the mask comprises a diffusing stratum disposed to randomly diffuse light passing through the diffusing stratum and comprising a plurality of first mounting tabs, and a separate graduating stratum disposed to suppress optical intensity of light projected from the luminaire onto the subject matter such that relatively greatest light transmission occurs along the central axis and relatively decreasing light transmission occurs with increasing distance from the central axis and comprising a plurality of second mounting tabs, wherein the first mounting tabs and the second mounting tabs are flexible and are disposed to engage the luminaire and to secure the diffusing stratum and the graduating stratum in selected positions on the luminaire.

6. The combination of claim 5, wherein the flexible mounting tabs comprise fastening elements including hook and loop fastener.

7. A mask for use with a luminaire having a light source, to mitigate undesired optical effects visited upon subject matter to be illuminated by the luminaire, which undesired optical effects arise from the luminaire, wherein the mask comprises at least one first light transmissive stratum which may cover at least the light source of the luminaire, and light attenuating elements disposed on the first light transmissive stratum, which light attenuating elements are operable to suppress optical intensity of light projected from the luminaire onto the subject matter by diffusing light passing through the first light transmissive stratum such that relatively greatest light transmission occurs along the central axis and relatively decreasing light transmission occurs with increasing distance from the central axis;

at least one mounting element disposed to support the mask at a predetermined position relative to the luminaire;

at least one second light transmissive stratum which may cover at least the light source of the luminaire, and light attenuating elements disposed on the second light transmissive stratum, which light attenuating elements are operable to suppress optical intensity of light projected from the luminaire onto the subject matter by diffusing light passing through the second light transmissive stratum such that relatively greatest light transmission occurs along the central axis and relatively decreasing light transmission occurs with increasing distance from the central axis, and wherein the light attenuating elements have a property of assuring that transition from the greatest light transmission to the relatively decreasing light transmission is not readily discernible to the unaided eye; and at least one second mounting element disposed to engage the luminaire and to secure the second light diffusing stratum at a selected position relative to the luminaire.

8. The mask of claim 7, wherein the mask comprises a diffusing stratum disposed to randomly diffuse light passing through the diffusing stratum, and a separate graduating stratum is the second light transmissive stratum disposed to suppress optical intensity of light projected from the luminaire onto the subject matter such that relatively greatest light transmission occurs along the central axis and relatively decreasing light transmission occurs with increasing distance from the central axis.

\* \* \* \* \*